United States Patent
Conaway et al.

(10) Patent No.: US 11,767,126 B2
(45) Date of Patent: Sep. 26, 2023

(54) METHODS AND SYSTEMS FOR AUTOMATIC TIME KEEPING OF ELECTRONIC CHECKLISTS

(71) Applicant: HONEYWELL INTERNATIONAL INC., Morris Plains, NJ (US)

(72) Inventors: Cody Ryan Conaway, Phoenix, AZ (US); Barbara Holder, Seattle, WA (US); Steven Curtis Crouch, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 262 days.

(21) Appl. No.: 16/836,330

(22) Filed: Mar. 31, 2020

(65) Prior Publication Data
US 2020/0346783 A1    Nov. 5, 2020

Related U.S. Application Data

(60) Provisional application No. 62/840,992, filed on Apr. 30, 2019.

(51) Int. Cl.
*G06F 3/0482* (2013.01)
*B64D 43/00* (2006.01)
(Continued)

(52) U.S. Cl.
CPC .......... *B64D 43/00* (2013.01); *G06F 3/0482* (2013.01); *G06F 3/04817* (2013.01); *G06F 9/4881* (2013.01); *G06F 16/9024* (2019.01)

(58) Field of Classification Search
CPC ... B64D 43/00; G06F 3/04817; G06F 3/0482; G06F 9/4881; G06F 16/9024; G06Q 10/06316
See application file for complete search history.

(56) References Cited

U.S. PATENT DOCUMENTS 5,454,074 A    9/1995 Hartel et al.
6,753,891 B1    6/2004 Chohan et al.
(Continued)

FOREIGN PATENT DOCUMENTS

WO    2017021934 A1    2/2017
WO    2018087745 A1    5/2018

OTHER PUBLICATIONS

European Extended Search Report dated Oct. 9, 2020 in counterpart European Patent Application No. 20169236.5 (11 pages, in English).

*Primary Examiner* — Jennifer N Welch
*Assistant Examiner* — Kuang F Chen
(74) *Attorney, Agent, or Firm* — Bookoff McAndrews, PLLC

(57) ABSTRACT

Disclosed are methods, systems, and non-transitory computer-readable medium for automatic time keeping of an electronic checklist. One method may include: receiving a user and/or system input associated with a graphical user interface (GUI) of an electronic checklist; determining whether the user and/or system input triggers a timer event; in response to determining that the user and/or system input triggers the timer event, determining whether the timer event is a first type of timer event or a second type of timer event; in response to determining that the timer event is the first type of timer event, performing a first timer process; and in response to determining that the timer event is the second type of timer event, performing a second timer process.

20 Claims, 14 Drawing Sheets

(51) Int. Cl.
    *G06F 16/901*     (2019.01)
    *G06F 9/48*     (2006.01)
    *G06F 3/04817*     (2022.01)

(56) References Cited

U.S. PATENT DOCUMENTS

| | | |
|---|---|---|
| 8,527,871 B2 | 9/2013 | Holder et al. |
| 8,736,464 B1 | 5/2014 | Downs Mullen |
| 10,467,989 B2 * | 11/2019 | Branthomme ......... G09G 5/363 |
| 2007/0150119 A1 * | 6/2007 | Mitchell ................ G06Q 10/10 701/1 |
| 2007/0286030 A1 * | 12/2007 | Brech .................... G04F 1/005 368/89 |
| 2012/0209468 A1 * | 8/2012 | Thomas ................. G07C 5/006 701/32.4 |
| 2016/0216849 A1 | 7/2016 | Kawalkar et al. |
| 2020/0004205 A1 * | 1/2020 | Powchowicz ............ G06F 1/14 |
| 2020/0047913 A1 * | 2/2020 | Shavit .................... B64D 45/00 |
| 2020/0401609 A1 * | 12/2020 | Hurley .................. G06F 16/285 |

\* cited by examiner

METHODS AND SYSTEMS FOR AUTOMATIC TIME KEEPING OF ELECTRONIC CHECKLISTS

CROSS-REFERENCE TO RELATED APPLICATION(S)

This application claims the benefit of priority to U.S. Provisional Application No. 62/840,992, filed Apr. 30, 2019, the contents of which is incorporated by reference in its entirety.

TECHNICAL FIELD

Various embodiments of the present disclosure relate generally to methods and systems for automatic time keeping of electronic checklists and, more particularly, to methods and systems for automatic time keeping of avionics electronic checklists.

BACKGROUND

Generally, aircraft checklists contain tasks which require users of an aircraft (e.g., flight crew, pilots, maintenance engineers, etc.) to verify the correct performance of actions between an instruction of the aircraft checklist and a component or control of the aircraft (e.g., of a cockpit of the aircraft). However, the users may sometimes commit errors due to the unintentional omission of tasks or perform tasks out of order.

For instance, some aircraft checklists may contain tasks that may require two different types of waiting: (1) tasks that have an associated time limit and, thus, the crew cannot perform any other actions/tasks until the waiting is complete; and (2) tasks with time limits and the crew may continue the checklist, but the crew must remember to come back and readdress the timed task.

The first situation may introduce a limitation in crew efficiency. For instance, the crew efficiency may be limited by interrupting a task flow and, if the crew does not know precisely when the waiting period is over, the crew could end up waiting longer than is required. The crew may also use external timers, such as watches or phones, to time the event. This use of external timers may increase crew workload because the crew needs to use a different device, thereby increasing the number of steps required to perform the task.

In the second situation, where the crew may continue a checklist with a timed task, the potential for an error of omission is introduced. For instance, if the crew does not remember that a timed task was running concurrently while completing remaining tasks of the checklist, additional error(s) could be introduced. As an example, a wing anti-ice task of a de-icing checklist may be required to be on for at least 5 minutes; when the wing anti-ice task is started, a timer may be started (e.g., by a crew member using an external device, such as a stop watch), and the crew may continue the checklist; if the crew forgets the wing anti-ice task, it could cause damage to equipment, use additional resources, etc.

As briefly outlined above, user errors (or procedures to avoid user errors) may increase user cognitive workload through increased cognitive demands, increase user time on tasks to complete checklists, and/or cause accidents. Therefore, there is a challenge to start timers for users, inform users when timers have been activated, inform users of a status of a timer, inform users when timers have ended, etc., so as to reduce cognitive workload, reduce user time associated with completion of checklists, and/or avoid accidents.

The present disclosure is directed to overcoming one or more of these above-referenced challenges.

SUMMARY OF THE DISCLOSURE

According to certain aspects of the disclosure, systems and methods are disclosed for automatic time keeping of avionics electronic checklists.

For instance, a method may include: receiving a user and/or system input associated with a graphical user interface (GUI) of an electronic checklist; determining whether the user and/or system input triggers a timer event; in response to determining that the user and/or system input triggers the timer event, determining whether the timer event is a first type of timer event or a second type of timer event; in response to determining that the timer event is the first type of timer event, performing a first timer process; and in response to determining that the timer event is the second type of timer event, performing a second timer process.

A system may include: a memory storing instructions; and a processor executing the instructions to perform a process. The process may include: receiving a user and/or system input associated with a graphical user interface (GUI) of an electronic checklist; determining whether the user and/or system input triggers a timer event; in response to determining that the user and/or system input triggers the timer event, determining whether the timer event is a first type of timer event or a second type of timer event; in response to determining that the timer event is the first type of timer event, performing a first timer process; and in response to determining that the timer event is the second type of timer event, performing a second timer process.

A non-transitory computer-readable medium may store instructions that, when executed by a processor, cause the processor to perform a method. The method may include: receiving a user and/or system input associated with a graphical user interface (GUI) of an electronic checklist; determining whether the user and/or system input triggers a timer event; in response to determining that the user and/or system input triggers the timer event, determining whether the timer event is a first type of timer event or a second type of timer event; in response to determining that the timer event is the first type of timer event, performing a first timer process; and in response to determining that the timer event is the second type of timer event, performing a second timer process.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and method for automatic time keeping of electronic checklists.

In general, the present disclosure is directed to systems and method for automatic time keeping of avionics electronic checklists. Specifically, as discussed in detail below, a system of the present disclosure may automatically start timer functions for a task, start timer functions for the task on a same device as a checklist GUI, and/or notify users when timer functions have ended. For instance, the system of the present disclosure may receive user and/or system inputs; determine whether the user and/or system inputs trigger a timer event; if a timer event is triggered, start a timer function and display the timer function on the checklist GUI; and when the timer function has ended, notify the user, e.g., visually on the checklist GUI or aurally via an audio or alert system. Therefore, the systems and methods of the present disclosure may reduce cognitive workload (or increase human performance by using the cognitive workload for other tasks in the cockpit), reduce time to complete checklists, and/or avoid accidents.

While this disclosure describes the systems and methods with reference to aircraft, it should be appreciated that the present systems and methods are applicable to electronic checklists of vehicles, including those of drones, automobiles, ships, or any other autonomous and/or Internet-connected vehicle. Moreover, it should be appreciated that the present systems and methods are applicable to electronic checklists in general.

Figure 1:
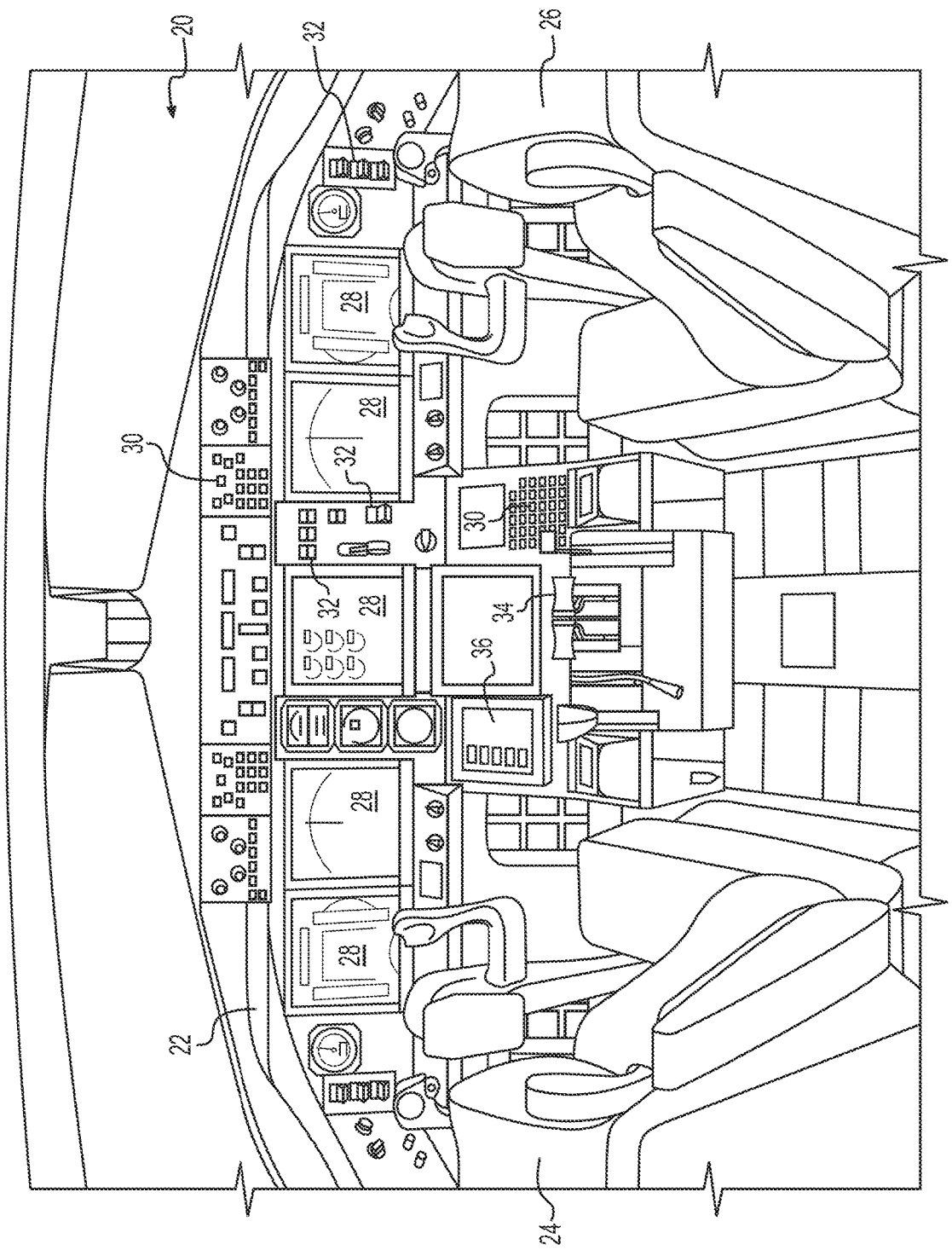
FIG. 1 depicts an exemplary vehicle system environment for displaying electronic vehicle checklists, according to one or more embodiments.

As shown in FIG. 1, an exemplary system environment for an electronic checklist is depicted, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be touch screen displays.

Figure 2:
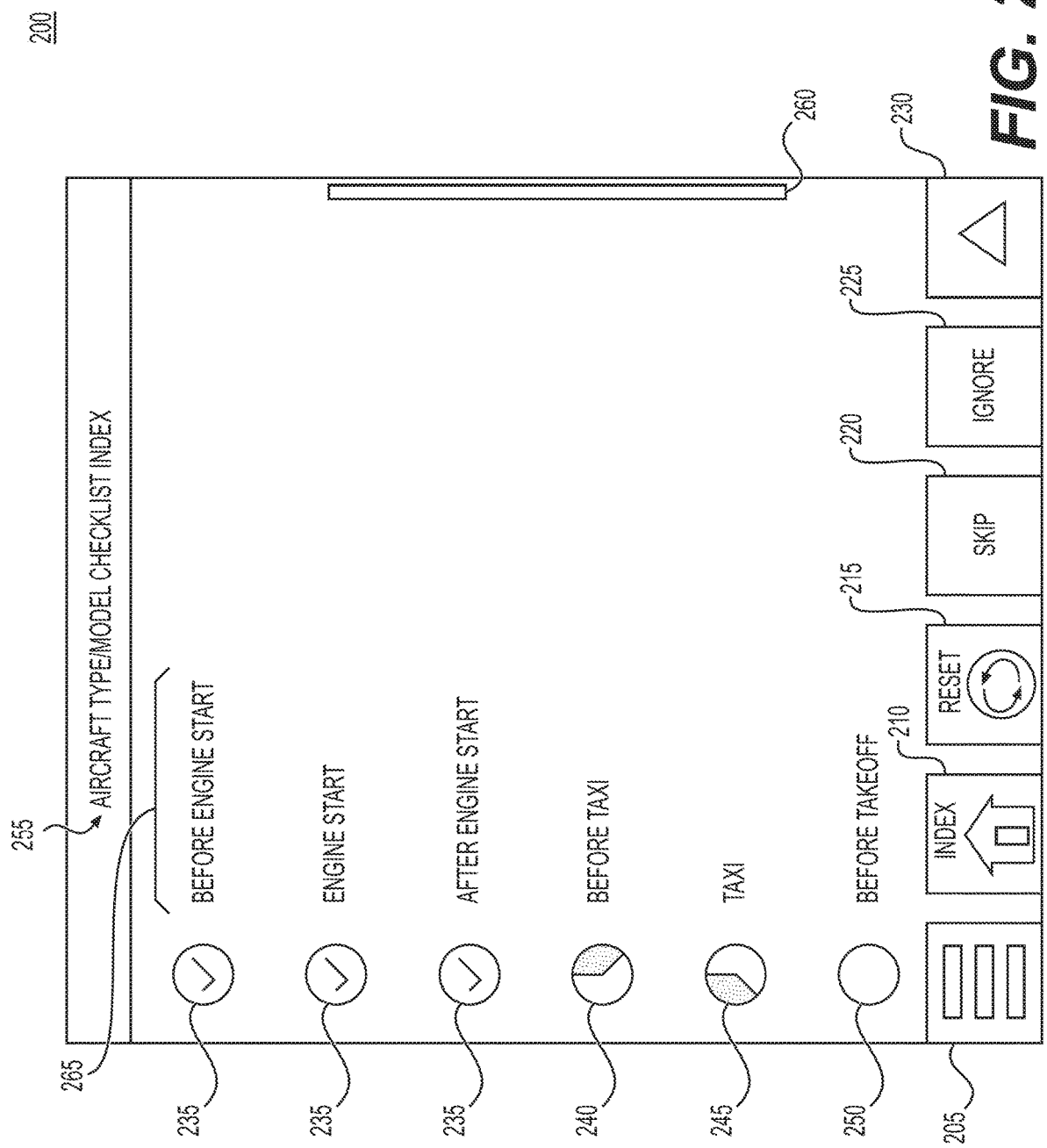
FIGS. 2 and 3 depict GUIs for exemplary electronic checklists, according to one or more embodiments.
Figure 3:
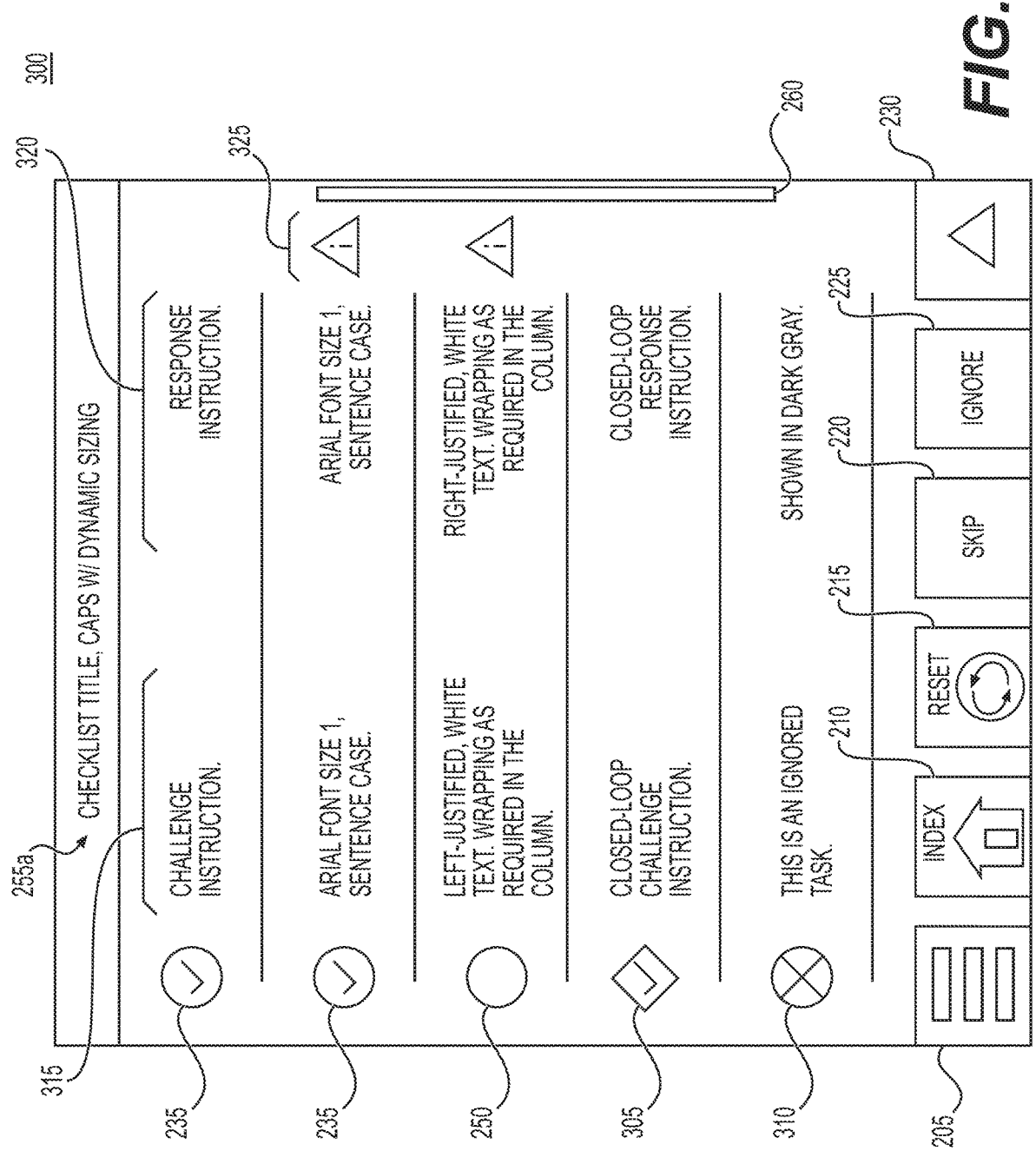

One of the front displays 28 or the control touch screen display 36 (called herein "vehicle manager touch screen") may be configured to operate as a vehicle manager that may display interactive electronic checklists and/or navigation or other vehicle system data. Specifically, a processor may execute a vehicle manager program (comprised of instructions executable by the processor) that causes the vehicle manager touch screen to display a vehicle manager display. For instance, the vehicle manager display may include one or more GUIs as disclosed herein (or variations thereof), such as GUI 200 and GUI 300 (as depicted in FIGS. 2 and 3, respectively).

The processor may cause the vehicle manager touch screen to display the vehicle manager display by generating images and transmitting the images to the vehicle manager touch screen to be displayed. Alternatively, the processor may generate instructions and information and transmit the instructions and information to a graphics processing unit (GPU). The GPU may generate the images to be displayed on the vehicle manager touch screen. The vehicle manager program may be stored in a memory. The memory may be connected to the processor so that the processor may receive stored instructions or data, and the processor may process the instructions, stored data, and received information, in accordance with the vehicle manager program. The memory and the processor may be connected to the vehicle manager touch screen either directly or indirectly. Collectively the memory, the processor, and the vehicle manager touch screen may be referred to as a "vehicle manager system." In one embodiment, the vehicle manager system may be an electronic procedure system of a vehicle.

For instance, the vehicle manager program may control a functionality and configuration of the vehicle manager touch screen, in accordance with a loadable checklist control file (called herein a "loadable database"), e.g., received from a cloud service. The vehicle manager program may store the loadable database in the memory. The vehicle manager program may control the configuration of the vehicle manager touch screen, based on user inputs to the system, data from other vehicle systems, and/or FMS data from, e.g., a cloud FMS. Specifically, the vehicle manager program may display the vehicle manager display to depict an electronic checklist in accordance with the loadable database, and receive user inputs to view and/or to change the configuration of the vehicle manager touch screen.

Generally, user inputs may be a touch interaction with the vehicle manager touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, in accordance with the vehicle manager program.

FIGS. 2 and 3 depict exemplary GUIs for an electronic checklist, according to one or more embodiments. Specifically, FIGS. 2 and 3 may depict a functionality and configuration of the vehicle manager touch screen, in accordance with a loadable database received from a cloud service.

In FIG. 2, GUI 200 may include a group of home icons (including one or more of a system function menu icon 205, an index icon 210, a reset icon 215, a skip icon 220, an ignore icon 225, a display control drop down menu icon 230), one or more completed task indicators 235, one or more partially completed task indicators 240 and 245, one or more incomplete task indicators 250, a header 255, a scroll bar indicator 260, and one or more task titles 265. A processor, as described above, may cause GUI 200 to be displayed on the vehicle manager touch screen of the system. The GUI 200 may be a home menu for a vehicle manager system. One or more tasks (a task may be an indicator associated with a task title) may represent a sub-checklist. A user may select the task, and the sub-check list corresponding to the selected task may be displayed; for instance, FIG. 3 may depict an example of a sub-check list that is displayed in GUI 300. In each checklist (parent checklist), any task may represent a sub-checklist of the parent checklist (e.g., a sub-check list to a sub-checklist is a grandchild to the home menu).

In FIG. 3, the GUI 300 may include the same features as the GUI 200, however it may also be different, and it may include a different header 255*a*, one or more system completed task indicators 305, one or more ignored task indicators 310, one or more challenge instructions 315, one or more response instructions 320, and one or more additional information indicators 325. Specifically, as mentioned above, when a user selects a task with a sub-checklist, the processor may update the display to display the sub-checklist. The different header 255*a* may correspond to the task title 265 associated with the selected task (or a sub-checklist name if different than the task title 265). The one or more challenge instructions 315 and the one or more response instructions 320 may each be associated with an indicator. The one or more challenge instructions 315 may contain text associated with the task the user is to focus attention on. The one or more response instructions 320 may contains text associated with the task the crew is to the focus on. The one or more additional information indicators 325 may be checklist impact notifications (CINs). The one or more additional information indicators 325 may be associated with tasks that have additional information related to notes, cautions, and warnings. CINs may provide access to notes, cautions, and warnings for individual tasks by a message popup.

Figure 4:
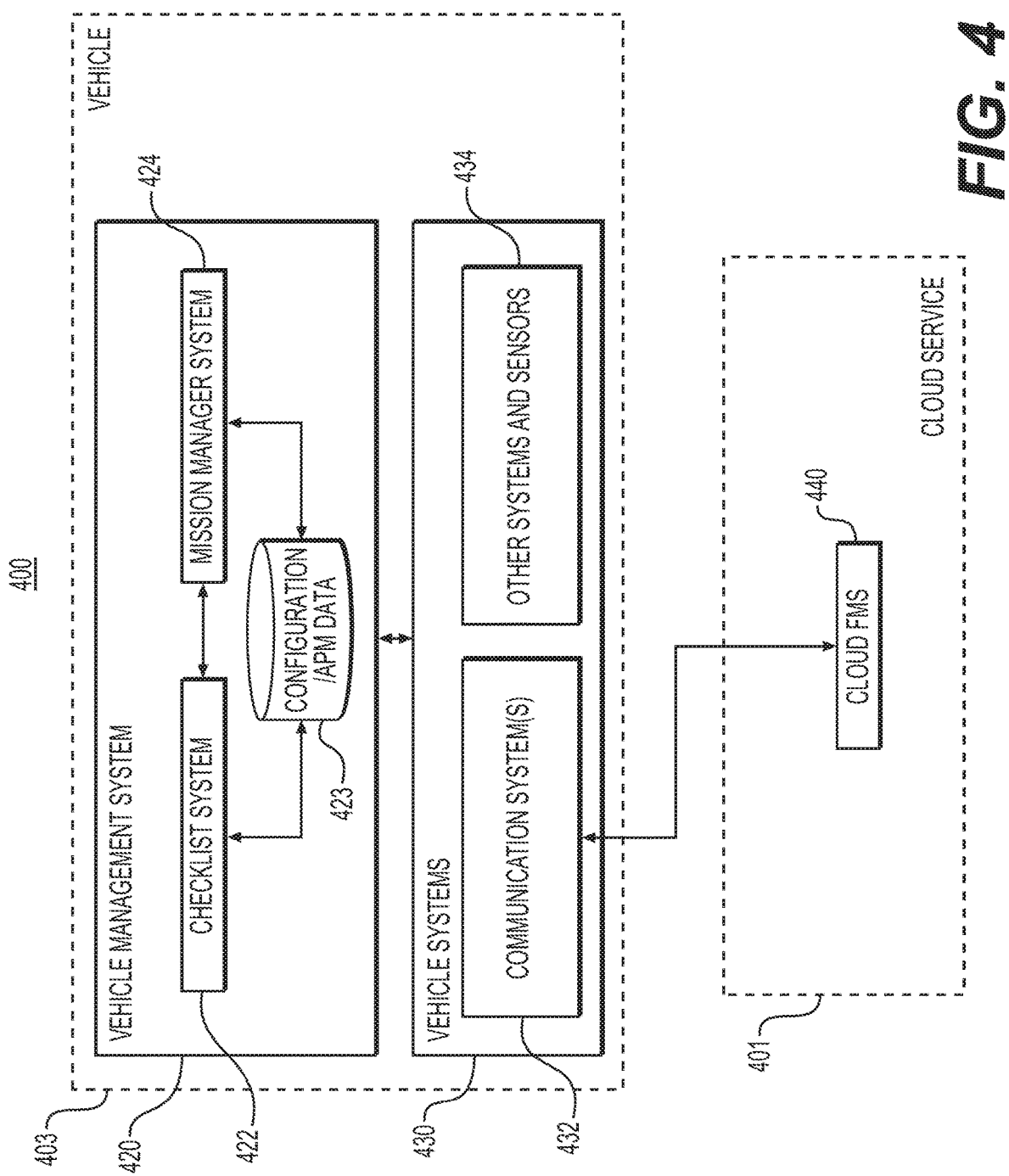
FIG. 4 depicts an exemplary block diagram of a system for automatic time keeping of avionics electronic checklists, according to one or more embodiments.

FIG. 4 depicts an exemplary block diagram of a system 400 for automatic time keeping of avionics electronic checklists, according to one or more embodiments. The system 400 may include a cloud service 401 and/or a vehicle 403. The cloud service 401 and the vehicle 403 may communicate over a network using, e.g., a TCP/IP communication infrastructure, or the cloud service 401 and the vehicle 403 may communicate over the network and/or satellite communications infrastructure, etc.

The cloud service 401 may include a cloud flight management system (FMS) 440 and/or other software as a service (SaaS) systems. The cloud FMS 440 may be a cloud-based platform that provides FMS services to any user who has authorized access to the cloud FMS 440. Specifically, the cloud FMS 440 may provide FMS micro-services. The FMS micro-services may be FMS services organized as a collection of specialized modular services. In some implementations, the FMS micro-services may be software applications stored, at least in part, in one or more servers remote from the vehicle 403, for cloud-based access from the vehicle 403. The FMS micro-services may be modular services which are developed, deployed, and scaled independently of each other, messaging-enabled to communicate with various components within the cloud FMS 440, and organized around capabilities. The FMS micro-services may include, for example, flight planning services, in-flight navigation services, airport specific services, ground communication services, weather services, services for computing fuel scenarios, services for computing optimization scenarios, services for offsetting deviations, and services for computing approach procedures. The FMS micro-services may be implemented as hardware, software, and/or a combination of hardware and software.

The vehicle 403 may include a vehicle management system 420 and vehicle systems 430. In one embodiment, the vehicle management system 420 may be an electronic procedure system of a vehicle. The vehicle management system 420 may include a checklist system 422, a mission manager system 424, and/or a configuration memory 423 storing configuration data and/or aircraft profile management (APM) data. The configuration data may include configuration rules that generally apply to checklists and/or display of information. The APM data may include additional configuration rules specific to different aircraft defined by original equipment manufacturers (OEM). The vehicle systems 430 may include one or more communications system(s) 432 and other systems and sensors 434.

The one or more communications system(s) 432 may include one or more of a cellular communications system, a Wi-Fi system, a radio communications system, a satellite communications system, etc. The one or more communications system(s) 432 may receive and transmit messages to/from the vehicle 403 from/to the cloud 401 (e.g., the cloud FMS 440). The one or more communications system(s) 432 may also communicate with the vehicle management system 420. For instance, the one or more communications system(s) 432 may receive FMS data from the cloud FMS 440, and transmit the FMS data to the vehicle management system 420.

The other systems and sensors 434 may include one or more of navigation systems (e.g., GPS systems), engine systems, actuation systems, control systems, temperature systems, life systems, external sensors (e.g., weather radar, temperature, pressure, density, velocity sensors) or internal sensors (e.g., cabin pressure sensor), etc. of the vehicle 403. The other systems and sensors 434 may communicate with the vehicle management system 420. For instance, the other systems and sensors 434 may transmit vehicle systems data to the vehicle management system 420.

The checklist system 422 may communicate with the configuration memory 423, the mission manager system 424, and/or the other systems and sensors 434. The checklist system 422 may receive a loadable database from a checklist designer system. The checklist system 422 may also receive messages from the mission manager system 424; the configuration/APM data from the configuration memory 423; and the vehicle systems data of the other systems and sensors 434. The checklist system 422 may output checklists GUIs and/or information for checklist GUIs to the mission manager system 424, for displaying checklist GUIs by the mission manager system 424, in accordance with the loadable database, the messages, the configuration/APM data, and the vehicle systems data.

For instance, the checklist system 422 may extract one or more data structure(s) and one or more function(s) from the loadable database; extract rulebook rules from a rulebook (e.g., included in the loadable database); extract data from databases of the vehicle 403; extract configuration rules from the configuration/APM data; extract sensor data and/or synoptic data from vehicle systems data; extract notifications from the messages from the mission manager system 424 (e.g., a selection based on user inputs or a CAS message); and extract phase of flight information from messages from the mission manager system 424 (collectively, "checklist inputs"). The checklist system 422 may validate the checklist inputs, e.g., to ensure correct source(s), correct format, etc.

As discussed above, the loadable database may include the one or more function(s) and the one or more data structure(s) for generation and control of the checklist GUIs. Specifically, a data structure may include content and arrangement information. The content may be displayed in a checklist GUI in accordance with arrangement information. The configuration rules of the configuration/APM data may include display rules for how the content is to be displayed in accordance with the arrangement information. A function may include program code for how system and/or user inputs are to update the checklist GUI (e.g., as outputs).

For instance, the one or more data structure(s) may include information about minimum equipment lists (MELs), master MELs (MMELs), aircraft flight manuals (AFMs), configuration deviation lists (CDLs), etc. The program code of the one or more function(s) may control checklist GUIs and data based on events. Events may be based phase of flight, CAS messages, flight plan data, flight data, synoptics, and/or pilot action(s). For example, a function may start based on a phase of flight event (e.g., transition between takeoff and cruise), and the function may generate and display a first checklist GUI corresponding to one or more tasks for the transition from takeoff to cruise. As another example, a function may start based on an emergency event (e.g., information indicating a sensor detecting smoke, which may be included in the vehicle systems data), and generate and display a second checklist GUI corresponding to one or more tasks for resolving the emergency event. As discussed above, the checklist GUIs may be based on the one or more data structure(s), the configuration/APM data, and/or the one or more function(s).

The mission manager system 424 may communicate with the checklist system 422, the configuration memory 423, the other systems and sensors 434, and the cloud FMS 440 (via, e.g., the one or more communications systems 432). The mission manager system 424 may receive messages from the checklist system 422 (e.g., information/instructions/graphics for displaying the checklist GUI); the configuration/APM data from the configuration memory 423; the vehicle systems data of the other systems and sensors 434; and/or the FMS data from the cloud FMS 440.

The mission manager system 424 may manage MEL data, manage flight plan buffer and/or display, and/or manage checklist display and interactions from a user, such as a crew of an aircraft. Specifically, the mission manager system 424 may display one or more of the checklist GUIs, and receive and process user inputs. For instance, the mission manager system 424 may render GUIs for managing phase of flight based checklists, GUIs for managing CAS/emergency checklists, and/or GUIs for aircraft configurations, and manage crew selections with respect to the rendered GUIs. For instance, the mission manager may render the GUIs, as based on the messages from the checklist system 422; the configuration/APM data from the configuration memory 423; the vehicle systems data of the other systems and sensors 434; and/or the FMS data from the cloud FMS 440.

In one aspect of the disclosure the checklist system 422 may perform a time keeping process, in accordance with the loadable database. The time keeping process may include: receive checklist inputs (or "a user and/or system input") associated with a graphical user interface (GUI) of an electronic checklist, such as a task of the electronic checklist that has a timer function associated with the task; determine whether the user and/or system input triggers a timer event; in response to determining that the user and/or system input triggers the timer event, determine whether the timer event is a first type of timer event or a second type of timer event; in response to determining that the timer event is the first type of timer event, perform a first timer process; and in response to determining that the timer event is the second type of timer event, perform a second timer process.

One or more data structure(s) and one or more function(s) from the loadable database may include, for one or more or for each checklist ("electronic checklist") of an electronic procedure system, one or more tasks that have one or more timer functions. The one or more data structure(s) may include information for how a timer function is to be displayed, such as before the timer function is activated, after the timer function is activated, when the timer function expires, and/or after the timer function has expired. The one or more function(s) may include program code to control the display of the timer function, in accordance with the information for how the timer function is to be displayed, and the user and/or system inputs.

For instance, the program code may display a timer graphic (such as a timer graphic 610 or a timer graphic 705 discussed below with respect to FIGS. 6A-6D and FIGS. 7A-7D, respectively) for a timer function. The timer graphic and timer function may be associated with a task of a checklist displayable in a checklist GUI. For instance, a data structure for the checklist GUI may include, in the content and arrangement information for a task, information for the timer graphic (such as text, images, position, etc.), a timer function indicator, and/or a timer function type indicator. The timer function indicator may indicate whether the task has a timer function. The timer function type indicator may indicate which type of timer process the timer function implements.

A function for the checklist GUI may include the timer function. The timer function may be program code for specific processes associated with the task to change the checklist GUI, in accordance with a timer, and/or user and/or system inputs, while the type of timer process may control general processes associated with the timer function. The timer function may display the timer graphic before the timer function is activated, or the timer function may display the timer graphic in response to a user input on the task displayed in the checklist GUI or a system input indicating a corresponding vehicle system was turned on/off, sensed an input, etc. for the task. The timer function may update the checklist GUI, in accordance with the timer, and/or user and/or system inputs.

To obtain the checklist inputs, the checklist system 422 may obtain the sensor data and/or synoptic data from vehicle systems data as system inputs and the notifications from the mission manager system 424 as user inputs. The checklist system 422 may determine whether the checklist inputs correspond to a task of a currently displayed checklist GUI. For instance, the checklist system 422 may determine whether a user input was input to a region of the checklist GUI associated with the task or whether a system input corresponds to a vehicle system associated with the task.

To determine whether the user and/or system input triggers a timer event, the checklist system 422 may determine whether the user and/or system input and the corresponding task are associated with a timer function. For instance, the checklist system 422 may determine whether the task has a timer function and, if so, whether the user and/or system input triggers the timer function. The checklist system 422 may obtain the data structure for the checklist GUI and extract a timer function indicator; if the timer function indicates that the corresponding task has a timer function, the checklist system 422 may determine the task has a timer function. The checklist system 422 may extract the timer function from a corresponding function.

The checklist system 422 may invoke the timer function to determine whether the user and/or system input triggers the timer function. A timer trigger (or timer event) may be: (1) a user input on the task to start a timer of the timer function; (2) a user input on a previous (e.g., a preceding task in order of the checklist, whether immediately preceding or not) or a linked task to start the timer of the timer function; (3) a system input indicating a vehicle system received an input within/above/below a threshold of a value and/or is in a defined state for the task; and/or (4) a system input indicating a vehicle system received an input within/above/below a threshold of a value and/or is in a defined state for the previous or linked task. For instance, in FIGS. 6A-6D, the timer trigger may be a user input on the task labeled "stabilize the airplane," a user input on the task labeled "whichever comes first," or a system input indicating the airplane was stabilized; in FIGS. 7A-7D, the timer trigger may be a user input on the "Wing anti-ice" task or a system input indicating an anti-ice system of the wing has been started.

To determine whether the timer event is a first type of timer event or a second type of timer event, the checklist system 422 may obtain the data structure for the checklist GUI and extract a timer function type indicator; if the timer function type indicator indicates that the timer function is a first type of timer function, the checklist system 422 may determine the timer event is a first type of timer event; and if the timer function type indicator indicates that the timer function is a second type of timer function, the checklist system 422 may determine the timer event is a second type of timer event. In response to determining the timer event is the first type of timer event, the checklist system 422 may perform the first timer process. In response to determining the timer event is the second type of timer event, the checklist system 422 may perform the second timer process.

As discussed above, the type of timer process may control general processes associated with the timer function. Specifically, the first timer type may be a sequential timer function that performs a sequential timer process, while the second timer type may be a non-sequential timer function that performs a non-sequential timer process. A sequential timer process may require the user to wait (e.g., by locking the GUI from further user inputs) until one or more (generally, arbitrarily complex) conditions are satisfied before continuing the checklist. A non-sequential timer process may allow the user to continue the checklist while the timer function tracks a timer for the task for the user. A sequential timer function may define the one or more conditions, a length of time for a timer, user and/or system inputs for the one or more conditions to be satisfied, and/or how the information for the timer graphic (such as text, images, position, etc.) is to displayed. A non-sequential timer function may define a length of time for a timer and/or how the information for the timer graphic (such as text, images, position, etc.) is be to displayed.

For instance, as displayed in FIGS. 6A-6D discussed below, a sequential timer function may have two alternative conditions: completion of a timer or a one of three Multi-Function Control Computer (MFCC) indicators. However, as indicated above, the one or more conditions may be arbitrarily complex in accordance with a logical expression (e.g., as defined by an author of the electronic checklist), by following orders of operations of logical operators, such as "and," "or" (exclusive or inclusive), "not," "nand," and "nor." The logical expression may include variables and the logical operators (executed following an order of operations). The variables may be linked to a user input (e.g., a user input on a certain GUI feature, such as a checklist task or button, etc.), linked to an indicator of the cockpit (e.g., system turned off or on) and/or linked to a system component (e.g., one of the other systems and sensors 434 turned off or on and reported to the checklist system 422), and the checklist system 422 may obtain data to populate the variables in the logical expression. If the logical expression(s) of the one or more conditions return(s) return satisfied, the checklist system 422 may determine the timer function is satisfied.

To perform the first timer process, the checklist system 422 may (if not already displayed) display a timer graphic. In one aspect of the disclosure, the first timer process may have one or more conditions that indicate an end of the timer function, and the one or more conditions may: (1) only include one or more timer condition(s); (2) include one or more timer condition(s) and one or more input condition(s); or (3) only include one more input conditions. The timer conditions may each be associated with a timer for a given period of time. The input conditions may be based on signals/inputs/messages from a user interface, other vehicle systems, etc., and may be determined to be satisfied by the signals/inputs/messages exceeding/within/below thresholds, ranges, etc. or indicating an on or off status, or any defined signal. For instance, in the case that the first timer process includes a timer condition, the checklist system 422 may start a timer of the timer function that corresponds to the timer condition. The timer graphic may include the one or more conditions, text describing a timer condition of the one or more conditions (if applicable), text describing conditions other than the timer condition (if applicable), logical operators for any two or more conditions (if applicable), a current time of the timer (either up to a certain time or down to zero from a certain time) (if applicable), and/or indicators for the conditions other than the timer (if applicable). The timer function of the first timer process (e.g., a sequential timer function) may, based on the user and/or system inputs and the time of the timer, determine whether the one or more conditions are satisfied, such as whether a timer has ended, the checklist system 422 received a message indicating a pre-defined status (e.g., engine on), etc. The timer function of the first timer process may update the timer graphic to depict changes in the time of the timer and/or the indicators for the conditions other than the timer.

To perform the second timer process, the checklist system 422 may (if not already displayed) display a timer graphic. In one aspect of the disclosure, the second timer process may have a condition that indicates an end of the timer function, and the condition may be: (1) a timer condition, (2) an input condition; or (3) or combinations thereof. For instance, in the case that the second timer process includes a timer condition, the checklist system 422 may start a timer of the timer function that corresponds to the timer condition. The timer graphic may include text describing the timer condition and a current time of the timer (either up to a certain time or down to zero from a certain time) (if applicable); and/or text describing the input condition and a status of the input condition (if applicable). The timer function of the second timer process (e.g., a non-sequential timer function) may, based on the user and/or system inputs and the time of the timer, determine whether a timer has ended. The timer function of the second timer process may update the timer graphic to depict changes in the time of the timer or the status of the input condition.

In one aspect of the disclosure, the timer function of the first/second timer process may receive user and/or system inputs to stop the timer. For instance, the timer may not strictly only track the passage of time, but may also track a time a vehicle system is on, off, within/above/below a threshold of a value, or in a defined state. For instance, as depicted in FIGS. 7A-7D, the wing anti-ice process may be required to proceed for five minutes, and if the timer function detects a user and/or system input indicating the wing anti-ice process has stopped (e.g., turned off the wing anti-ice vehicle system), the timer function may stop the five minute timer until the wing anti-process has resumed or been resolved in a different manner.

In another aspect of the disclosure, the timer function of the first/second timer process may change colors of text or graphics, flash the text or graphics, fade the text or graphics, to indicate status (e.g., less than 5 seconds, timer has ended, etc.) of the timer. The change in color, flash rate, or fade rate may correspond to an amount of time remaining on the timer.

The time keeping process may further include: determine whether the timer ends (or if the one or more conditions are satisfied); in response to determining the timer has not ended (or in response to the one or more conditions not being satisfied), return to the first timer process or second time process, based on the type of trigger event; in response to determining the timer ends (or in response to the one or more conditions being satisfied), notify the users (e.g., by outputting a notification, as discussed below); then, optionally, display the checklist GUI without the timer graphic; and proceed to wait until another a user/system input is received to start the time keeping process over.

To determine whether the timer ends, the checklist system 422 may determine a current time of the timer and determine whether the current time has elapsed up to a certain time or down to zero from a certain time. To determine whether the one or more conditions are satisfied, the checklist system 422 may: determine a current time of the timer and determine whether the current time has elapsed up to a certain time or down to zero from a certain time; determine whether other conditions, if any, are satisfied; perform logical operations to determine if the logical expression returns true; and in response to the logical expression returning true, determine the one or more conditions are satisfied.

Figure 7A:
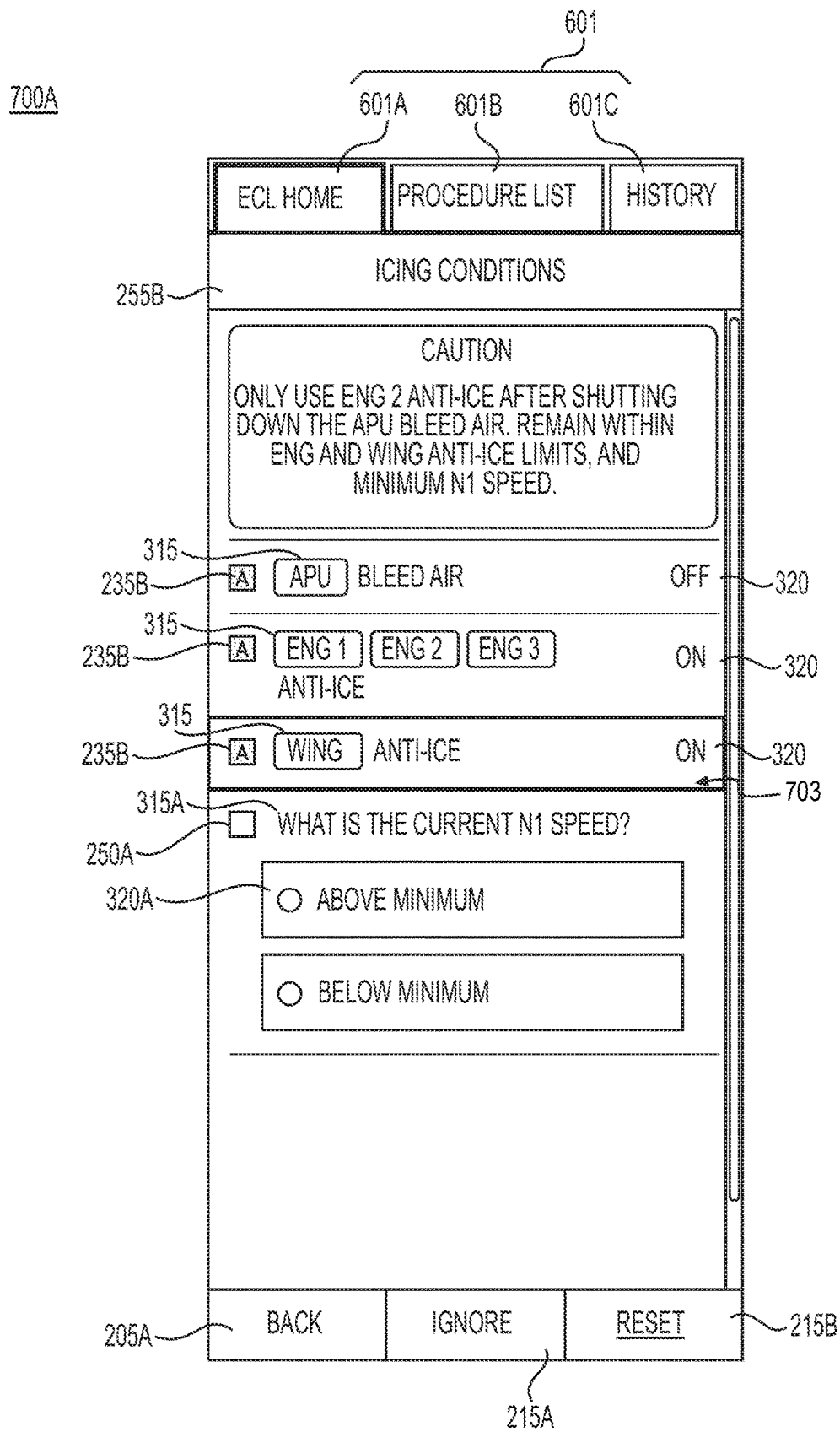
FIGS. 7A-7D depict exemplary GUIs for automatic time keeping of avionics electronic checklists, according to one or more embodiments.
Figure 7B:
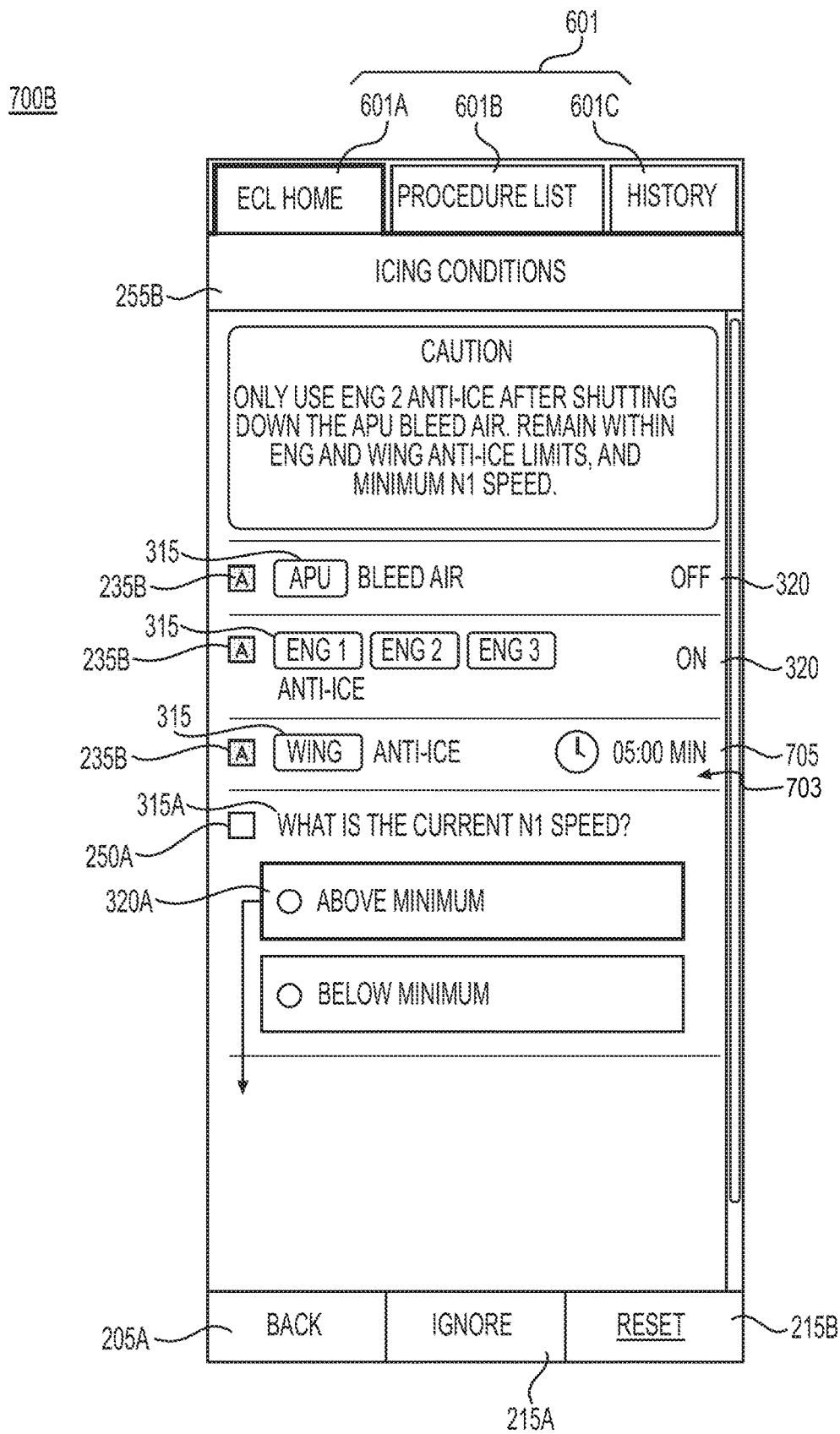
Figure 7C:
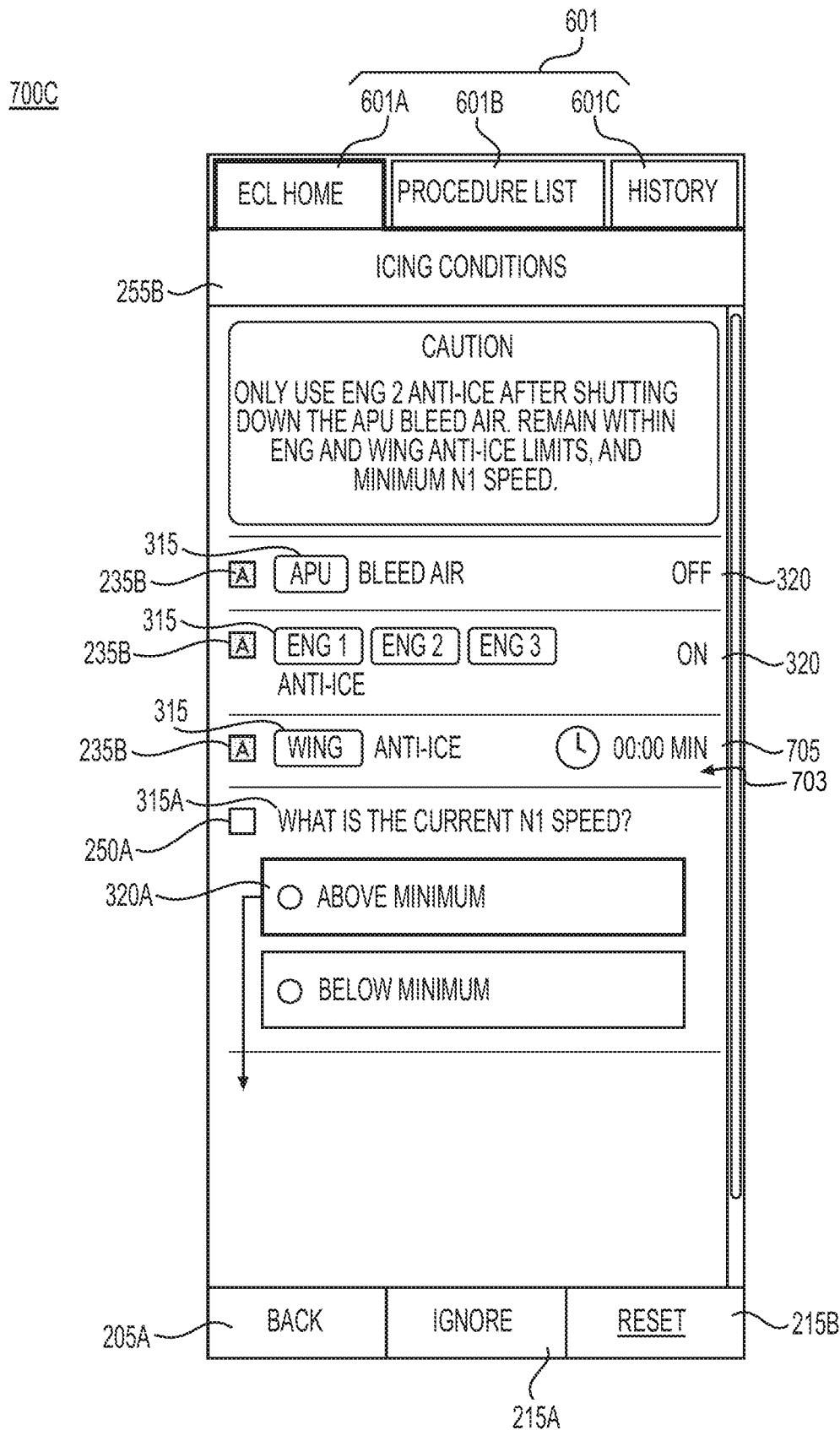
Figure 7D:
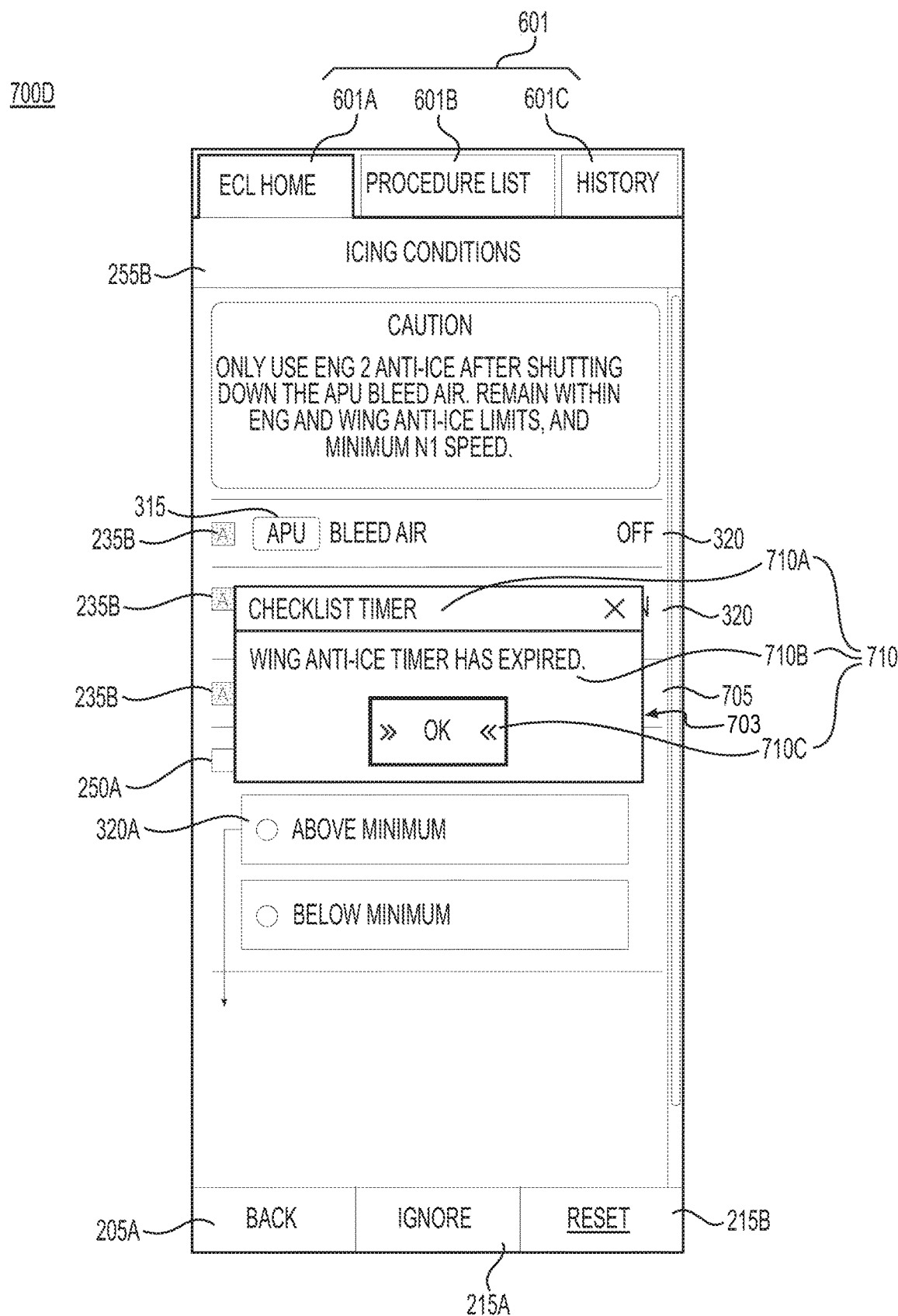

To notify the users, the checklist system 422 may display a notice on the checklist GUI (see, e.g., FIG. 7D). The notice may be a reminder to proceed (e.g., in the case of a sequential timer function) or a reminder to return the task (e.g., in the case of a non-sequential timer function), such as by returning to turn off/on a vehicle system, etc. Additionally or alternatively, the checklist system 422 may transmit instructions to an alert/audio system of the vehicle to audibly notify the user that the timer function has ended. Moreover, before displaying the notice, the checklist system 422 may determine whether the checklist associated with the timer function is currently being displayed to the user or whether the user is completing the checklist; in response to determining that the checklist is currently being displayed or the user is completing the checklist, the notice may display a confirmation icon; and, in response to determining that the checklist is not currently being displayed or the user is not completing the checklist (e.g., a different checklist is displayed or a different screen other than checklists is displayed), the notice may display a confirmation icon and/or a link icon. The confirmation icon may be selectable by a user input to indicate an affirmative recognition of the end of the timer function. The link icon may be selectable by user input to change the display to the checklist GUI for the checklist of the timer function. Therefore, the link icon may enable a user to quickly navigate back to the task associated with the timer function that prompted the notice. In this manner, a user may more quickly complete checklists by quickly accessing the specific task to be addressed.

Therefore, the systems and methods of the present disclosure may reduce cognitive workload (or increase human performance by using the cognitive workload for other tasks in the cockpit), reduce time to complete checklists, and/or avoid accidents. For instance, the checklist system 422 may reduce cognitive workload, reduce time to complete checklists, and/or avoid accidents, by automatically starting timer functions, starting timer functions on a same device as the checklist GUI, and/or notifying users when timer functions have ended.

Figure 5:
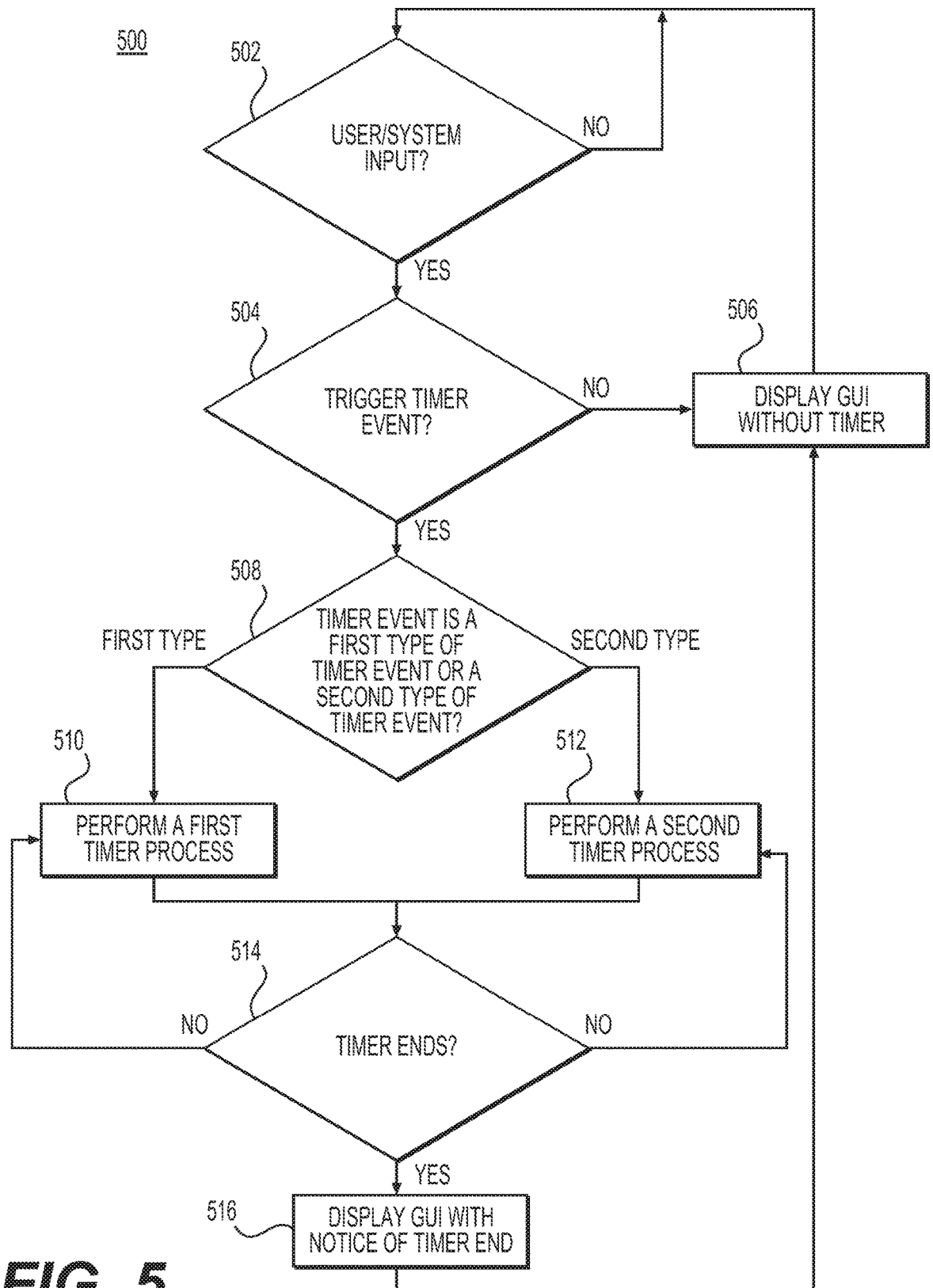
FIG. 5 depicts a flowchart for a method for automatic time keeping of avionics electronic checklists, according to one or more embodiments.
Figure 6A:
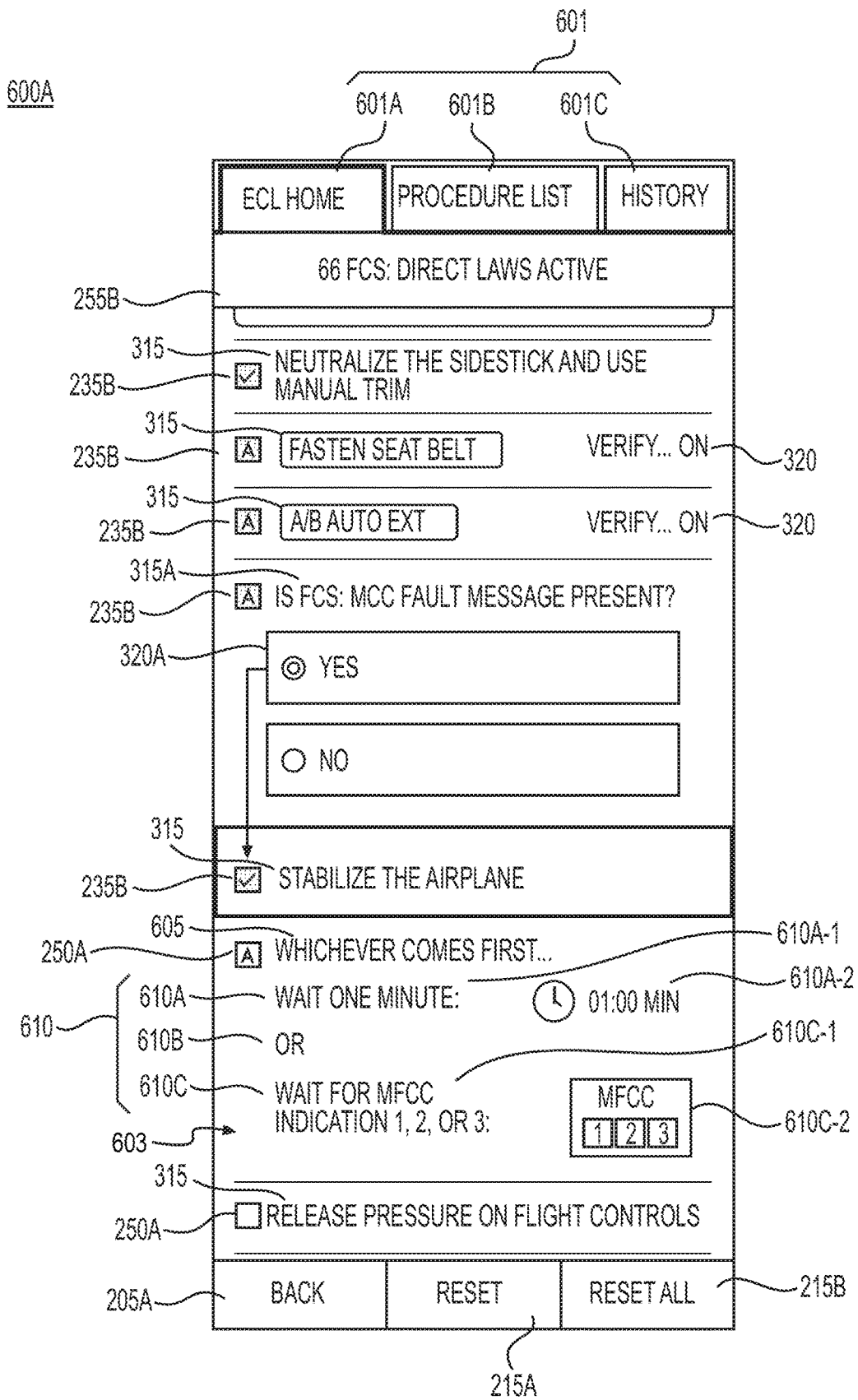
FIGS. 6A-6D depict exemplary GUIs for automatic time keeping of avionics electronic checklists, according to one or more embodiments.
Figure 6B:
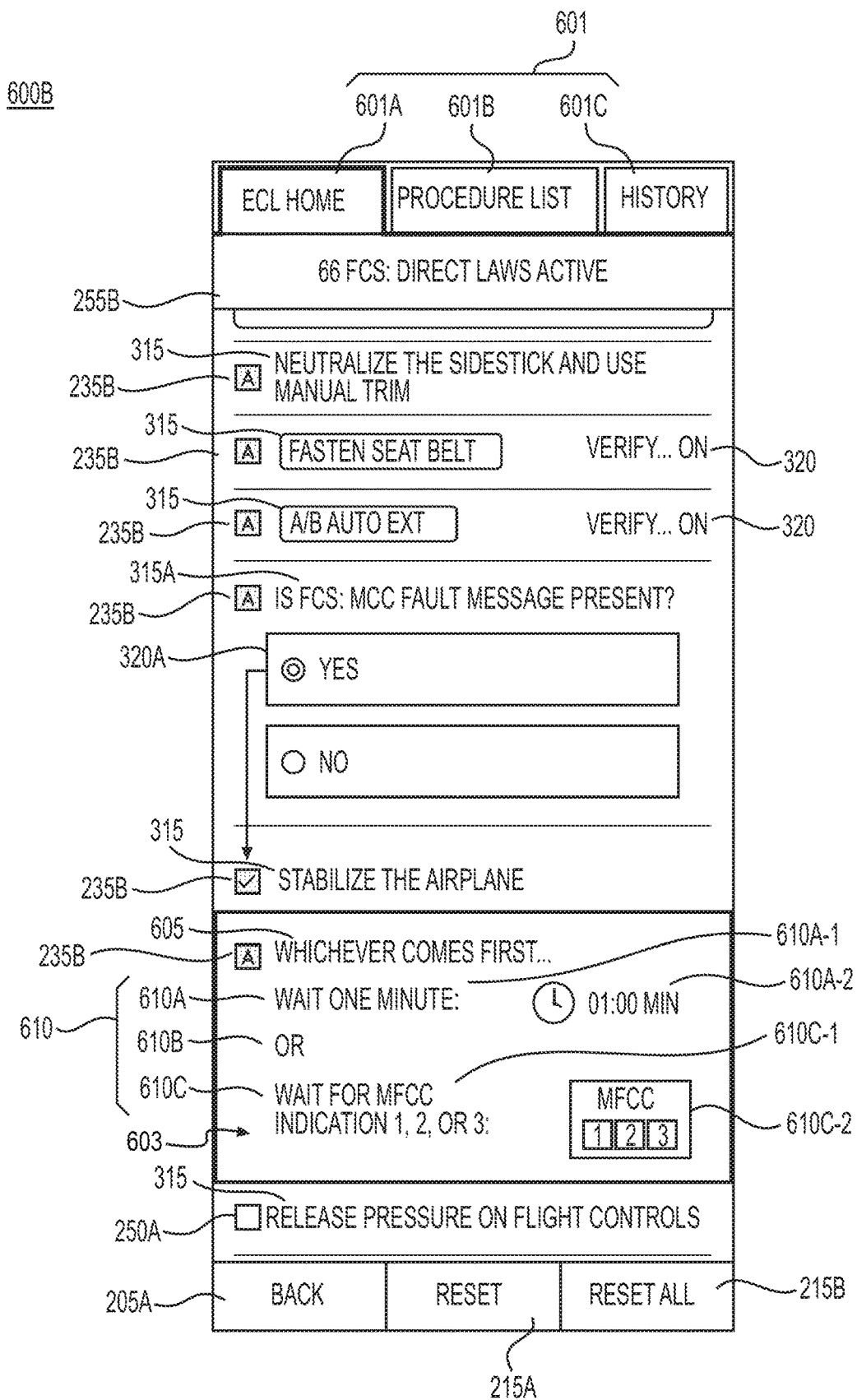
Figure 6C:
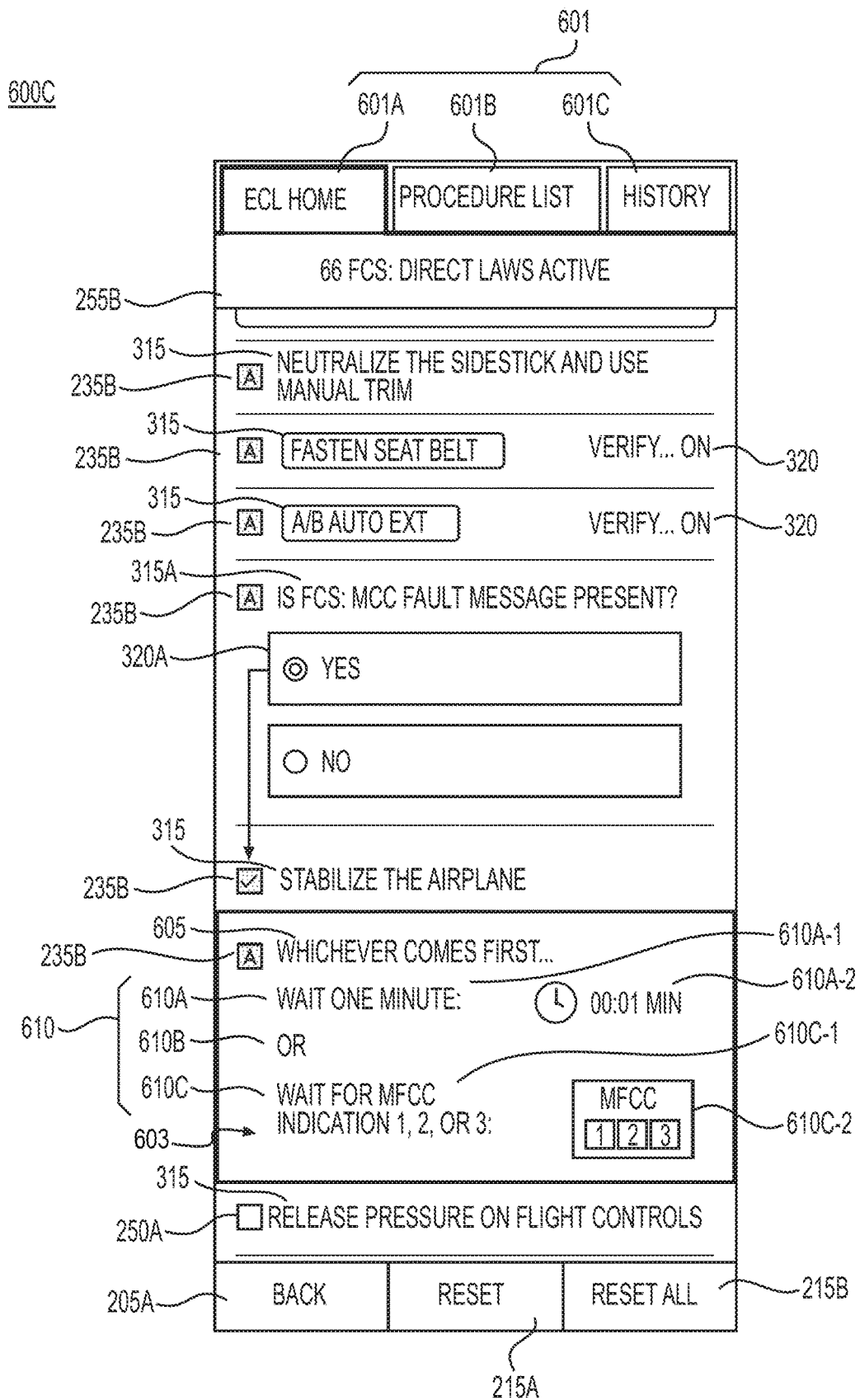
Figure 6D:
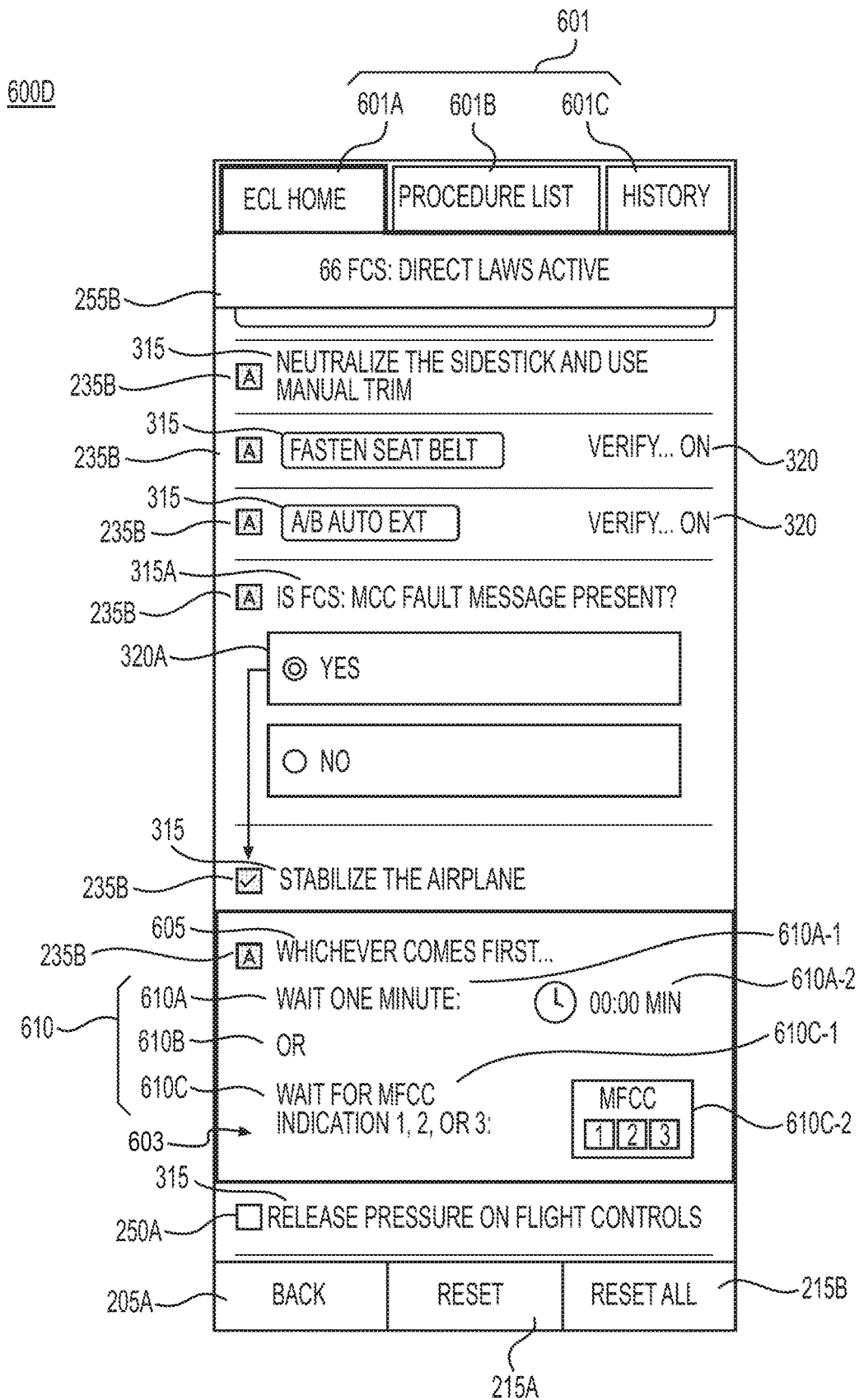

FIG. 5 depicts a flowchart 500 for a method for automatic time keeping of avionics electronic checklists, according to one or more embodiments. The method of the flowchart 500 may be performed by the checklist system 422, in accordance with a loadable database, as discussed above. The method of the flowchart 500 may correspond to the automatic time keeping process, described above. In the flowchart 500, the method may start at block 502 to determine whether a user and/or system input has been received. In response to determining that a user and/or system input has not been received (block 502: No), the method may proceed to return to block 502 to await a user and/or system input.

In response to determining that a user and/or system input has been received (block 502: Yes), the method may proceed to block 504 to determine whether a timer event has been triggered. For instance, the checklist system 422 may determine whether the user and/or system input is associated with a task, whether the task has a timer event, and invoke a timer function to determine whether a trigger event has occurred, as discussed above with respect to FIG. 4.

In response to determining that a timer event has not been triggered (block 504: No), the method may proceed to block 506 to display/continue to display a checklist GUI, with/without a timer graphic. For instance, the checklist system 422 may determine: the user and/or system input was not associated with a task; the task does not have a timer function; or the timer function did not determine a trigger event. The checklist system 422 may display the checklist GUI in accordance with the user and/or system input. Then, the method may proceed to block 502 to await a user and/or system input.

In response to determining that a timer event has been triggered (block 504: Yes), the method may proceed to block 508 to determine whether the timer event is a first type of timer event or a second type of timer event. For instance, the checklist system 422 may determine whether the timer function a first type of timer function or a second type of timer function to determine whether the timer event is a first type of timer event or a second type of timer event, as discussed above with respect to FIG. 4.

In response to determining that the timer event is a first type of timer event (block 508: First Type), the method may proceed to block 510 to perform a first timer process. In response to determining that the timer event is a second type of timer event (block 508: Second Type), the method may proceed to block 512 to perform a second timer process. For instance, the checklist system 422 may display the timer graphic (if not already displayed) for the timer function and perform the sequential or non-sequential processes, as discussed above with respect to FIG. 4.

Then, the method may proceed to block 514 to determine whether the timer has ended (or one or more conditions are satisfied, if checklist system 422 is performing the sequential process). In response to determining that the timer has not ended (or the one or more conditions are not satisfied) (block 514: No), the method may proceed to block 510 or block 512 to perform the first or second timer process, respectively, to update the checklist GUI. For instance, the checklist system 422 may update the timer graphic with a current time of the timer.

In response to determining that the timer has ended (or the one or more conditions are satisfied) (block 514: Yes), the method may proceed to block 516 to display the checklist GUI with a notice of the timer ending. For instance, the checklist system 422 may update the timer graphic with a current time of the timer (e.g., zero seconds or a completion time of a timer) and a reminder, as discussed above with respect to FIG. 4. Additionally or alternatively, the checklist system 422 may audibly alert the user, as discussed above with respect to FIG. 4.

Then, optionally, the method may proceed to block 506 to display the checklist GUI, with/without the timer graphic. Then, the method may proceed to block 502 to await a user and/or system input.

FIGS. 6A-6D depict exemplary GUIs for automatic time keeping of avionics electronic checklists, according to one or more embodiments. Specifically, FIGS. 6A-6D may depict a sequence of first timer process GUIs 600A-600D for a first timer process, as discussed above with respect to FIG. 4. First timer process GUI 600A, first timer process GUI 600B, first timer process GUI 600C, and first timer process GUI 600D, respectively, may depict the first timer process of the checklist system 422.

In the first timer process GUI 600A, the first timer process GUI 600A may be the same as the GUI 200 or GUI 300, however the first timer process GUI 600A may also include a different header 255B, a different group of home icons (including one or more of a second system function menu icon 205A, a second reset icon 215A and a reset all icon 215B), one or more second completed task indicators 235B, one or more second incomplete task indicators 250A, one or more second challenge instructions 315A, and/or one or more second response instructions 320A.

The different header 255B may correspond to a title of a checklist that is currently displayed. The different group of home icons may perform the same functions as the group of home icons discussed above. The one or more second completed task indicators 235B may be the same as the one or more completed task indicators 235. The one or more second incomplete task indicators 250A may be the same as the one or more incomplete task indicators 250. The one or more second challenge instructions 315A may be the same as one or more challenge instructions 315. The one or more second response instructions 320A may be the same as one or more response instructions 320, except the one or more second response instructions 320A may be selectable to input information (e.g., "Yes," "No," "Confirmed," "Verified," etc.), such as in response to content of the one or more second challenge instructions 315A.

The first timer process GUIs 600A-600D may also include tabs 601, including electronic checklist tab 601A, procedure list tab 601B, and/or a history tab 601C. The tabs 601 may be selectable by a user input to change a currently displayed GUI of the checklist system 422. The electronic checklist tab 601A may, in response to a user input, display an electronic checklist home GUI or a currently active checklist GUI. The procedure list tab 601B may, in response to a user input, display a procedure list GUI for the vehicle. The history tab 601C may, in response to a user input, display a history of one or more of user and/or system inputs for the vehicle, completed tasks of checklists, received CAS messages, etc.

The first timer process GUI 600A may also include a task 603 associated with a timer function. The task 603 may be depicted with a second incomplete task indicator 250A, as the first timer process GUI 600A may be a checklist GUI before the timer function has been activated by a timer trigger. The first timer process GUI 600A may also display a timer graphic 610 near task 603. The timer graphic 610 may include a timer challenge instruction 605, and/or one or more conditions 610, including first condition 610A, logical operator 610B, and second condition 610C. The timer challenge instruction 605 may contain text associated with the task 603 the user is to focus attention on and to inform the user of the functionality of the timer function. As discussed above, the one or more conditions may correspond to a timer and other conditions to determine when the timer function ends. For instance, as depicted in FIGS. 6A-6D, the one or more conditions 610 may indicate that the user is to wait one (1) minute (first condition 610A) or (logical operator 610B) wait for an indicator of MFCC (second condition 610C). The first condition 610A may include text 610A-1 and/or a time indicator 610A-2. The second condition 610C may include text 610C-1 and/or indicators 610C-2. The text 610A-1 and 610C-1 may be displayed in accordance with the data structure and the timer function associated with the task, as discussed above in FIG. 4. The indicators 610A-2 and 610C-2 may be displayed in accordance with the data structure and the timer function, as discussed above in FIG. 4, and specifically may depict a change in the timer or indicator of conditions other than the timer.

For instance, in the first timer process GUI 600B, the timer function may have determined a timer trigger and started a first timer process, as discussed above in FIG. 4. In response, the second incomplete task indicator 250A may be changed to a second completed task indicator 235B. Alternatively, the second incomplete task indicator 250A may be changed to the second completed task indicator 235B after the timer ends or the one or more conditions are satisfied.

In the first timer process GUI 600C, the timer function may update the time indicator 610A-2 (e.g., from one (1) minute to one (1) second), or any time between, in accordance with a time of a timer of the timer function. Note, the indicators 610C-2 may also have been updated during the same period of time as the time indicator 610A-2, if a user and/or system input indicated a satisfied condition for the indicators 610C-2.

In the first timer process GUI 600D, the timer function may update the time indicator 610A-2 to zero (0) seconds, in accordance with the time of a timer of the timer function. As the first timer process may be a sequential timer process, the timer function may not allow the user to proceed with the checklist depicted in the first timer process GUIs 600B-600D by, e.g., disabling user inputs into the checklist GUI (or portions thereof). The timer function may disable the user inputs until/after/in response to the timer ending or the one or more conditions being satisfied.

FIGS. 7A-7D depict exemplary GUIs for automatic time keeping of avionics electronic checklists, according to one or more embodiments. Specifically, FIGS. 7A-7D may depict a sequence of second timer process GUIs 700A-700D for a second timer process, as discussed above with respect to FIG. 4. Second timer process GUI 700A, second timer process GUI 700B, second timer process GUI 700C, and second timer process GUI 700D, respectively, may depict the second timer process of the checklist system 422.

In the second timer process GUI 700A, the second timer process GUI 700A may be the same as the first timer process GUI 600A, however the second timer process GUI 700A may also include a task 703 associated with a timer function. The task 703 may be depicted with a second complete task indicator 235A, as the second timer process GUI 700A may be a checklist GUI before the timer function has been activated by a timer trigger. For instance, the second complete task indicator 235A may be displayed in response to a user input on the task 703, but a timer graphic 705 may not be displayed until a system input confirms a corresponding input to a vehicle system has occurred (e.g., user input turning on wing anti-ice system). Additionally or alternatively, the second complete task indicator 235A may not be displayed until a timer of the timer function has ended, instead a second incomplete task indicator 250A may be displayed; in this case, the timer graphic 705 may be displayed in response to a user input on the task 703.

In the second timer process GUI 700B, the timer function may display the timer graphic 705 as a timer of the timer function starts. In the second timer process GUI 700C, the timer function may update the timer graphic 705 to depict zero (0) seconds, in accordance with the time of the timer of the timer function. As the second timer process may be a non-sequential timer process, the timer function may allow the user to proceed with the checklist depicted in the second timer process GUIs 700B-700C by, e.g., allowing user inputs into the checklist GUI (or portions thereof).

In the second timer process GUI 700D, the timer function may display a notice 710 on the checklist GUI. As discussed above with respect to FIG. 4, before displaying the notice 710, the checklist system 422 may determine whether the checklist associated with the timer function is currently being displayed to the user or whether the user is completing the checklist; in response to determining that the checklist is currently being displayed or the user is completing the checklist, the notice 710 may display a confirmation icon (depicted in the GUI 700D); and, in response to determining that the checklist is not currently being displayed or the user is not completing the checklist (e.g., a different checklist or a different screen other than checklists), the notice 710 may display a confirmation icon and/or a link icon (not depicted in the GUI 700D). In the GUI 700D, the checklist system 422 may have determined that the checklist is currently being displayed or the user is completing the checklist, so the notice 710 may include notice title 710A, notice description 710B, and/or a confirmation icon 710C. The notice title 710A, the notice description 710B, and/or the confirmation icon 710C may be defined by a data structure and the timer function associated with the task.

The notice title 710A may include text for a name of the timer function, which may or may not correspond to a title of the task 703. The notice description 710B may include text describing the timer function for the task 703 and/or next actions/task to be performed by the user. The confirmation icon 710C may be selectable by a user input. In response to a user input on the confirmation icon 710C, the checklist system 422 may register a confirmation that the user acknowledged the end of the timer for the task 703.

Figure 8:
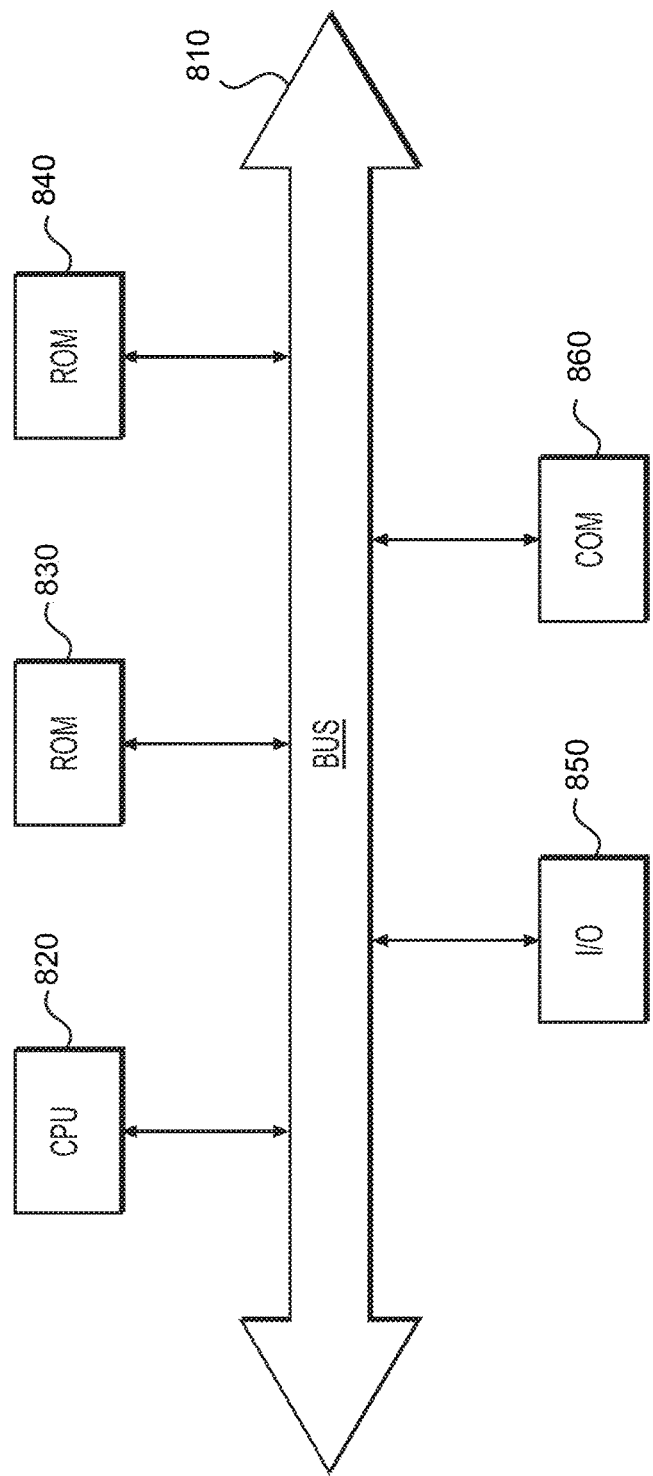
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A method for automatic time keeping of an electronic checklist for a vehicle system, the method comprising:
   receiving at least one of a user and system input associated with a graphical user interface (GUI) of the electronic checklist, wherein the at least one of the user and system input is associated with executing the electronic checklist;
   determining whether the at least one of the user and system input triggers a timer event;
   in response to determining that the at least one of the user and system input triggers the timer event, determining whether the timer event is a first type of timer event or a second type of timer event;
   in response to determining that the timer event is the first type of timer event, performing a sequential timer process; and
   in response to determining that the timer event is the second type of timer event, performing a non-sequential timer process, wherein each of the sequential timer process and non-sequential timer process include measuring an elapsed time,
   wherein the sequential timer process requires a user to wait until one or more conditions, associated with a timer function of the timer event of a task associated with the vehicle system, are satisfied before the user can continue executing the electronic checklist, and
   the non-sequential timer process allows the user to continue executing the electronic checklist while the timer function tracks a timer for the task associated with the timer event.

2. The method of claim 1, wherein the timer event is one or combinations of:
   a user input on a task to start a timer of a timer function of the task;
   a user input on a previous task or a linked task to start the timer of the timer function of the task;
   a system input indicating a vehicle system received an input within/above/below a threshold of a value or is in a defined state for the task; or
   a system input indicating a vehicle system received an input within/above/below a threshold of a value or is in a defined state for the previous task or linked task.

3. The method of claim 1, wherein the one or more conditions indicate an end of the timer function, and the one or more conditions include one or combinations of timer condition(s) or input condition(s).

4. The method of claim 1, further comprising:
   determining whether the timer ends or the one or more conditions are satisfied; and
   in response to determining the timer has ended or the one or more conditions are satisfied, displaying a notice on the GUI.

5. The method of claim 4, further comprising, before displaying the notice on the GUI:
   determining whether the electronic checklist associated with the timer function is currently being displayed to the user or whether the user is completing the electronic checklist;
   in response to determining that the electronic checklist is currently being displayed or the user is completing the electronic checklist, displaying the notice with a confirmation icon; and in response to determining that the electronic checklist is not currently being displayed or the user is not completing the electronic checklist, displaying the notice with at least one of the confirmation icon and a link icon, the confirmation icon being selectable by a user input to indicate an affirmative recognition of the end of the timer function, the link icon being selectable by a user input to change the display to the GUI for the electronic checklist of the timer function.

6. The method of claim 1, wherein the sequential timer process requires a user to wait by locking the GUI from further user inputs until one or more conditions, associated with a timer function of the timer event of a task, are satisfied before the user can continue executing the electronic checklist.

7. The method of claim 1, wherein allowing the user to continue executing the electronic checklist comprises allowing the GUI to accept inputs.

8. A system for automatic time keeping of an electronic checklist for a vehicle system, the system comprising:
a memory storing instructions; and
a processor executing the instructions to perform a process including:
receiving at least one of a user and system input associated with a graphical user interface (GUI) of the electronic checklist, wherein the at least one of the user and system input is associated with executing the electronic checklist;
determining whether the at least one of the user and system input triggers a timer event;
in response to determining that the at least one of the user and system input triggers the timer event, determining whether the timer event is a first type of timer event or a second type of timer event;
in response to determining that the timer event is the first type of timer event, performing a sequential timer process; and
in response to determining that the timer event is the second type of timer event, performing a non-sequential timer process, wherein each of the sequential timer process and non-sequential timer process include measuring an elapsed time,
wherein the sequential timer process requires a user to wait until one or more conditions, associated with a timer function of the timer event of a task associated with the vehicle system, are satisfied before the user can continue executing the electronic checklist, and
the non-sequential timer process allows the user to continue the electronic checklist while the timer function tracks a timer for the task associated with the timer event.

9. The system of claim 8, wherein the timer event is one or combinations of:
a user input on a task to start a timer of a timer function of the task;
a user input on a previous task or a linked task to start the timer of the timer function of the task;
a system input indicating a vehicle system received an input within/above/below a threshold of a value or is in a defined state for the task; or
a system input indicating a vehicle system received an input within/above/below a threshold of a value or is in a defined state for the previous task or linked task.

10. The system of claim 8, wherein the one or more conditions indicate an end of the timer function, and the one or more conditions include one or combinations of timer condition(s) or input condition(s).

11. The system of claim 8, further comprising:
determining whether the timer ends or the one or more conditions are satisfied; and
in response to determining the timer has ended or the one or more conditions are satisfied, displaying a notice on the GUI.

12. The system of claim 11, further comprising, before displaying the notice on the GUI:
determining whether the electronic checklist associated with the timer function is currently being displayed to the user or whether the user is completing the electronic checklist;
in response to determining that the electronic checklist is currently being displayed or the user is completing the electronic checklist, displaying the notice with a confirmation icon; and
in response to determining that the electronic checklist is not currently being displayed or the user is not completing the electronic checklist, displaying the notice with at least one of the confirmation icon and a link icon, the confirmation icon being selectable by a user input to indicate an affirmative recognition of the end of the timer function, the link icon being selectable by a user input to change the display to the GUI for the electronic checklist of the timer function.

13. The system of claim 8, wherein the sequential timer process requires a user to wait by locking the GUI from further user inputs until one or more conditions, associated with a timer function of the timer event of a task, are satisfied before the user can continue executing the electronic checklist.

14. The system of claim 8, wherein allowing the user to continue executing the electronic checklist comprises allowing the GUI to accept inputs.

15. A non-transitory computer-readable medium storing instructions that, when executed by a processor, cause the processor to perform a method for automatic time keeping of an electronic checklist for a vehicle system, the method comprising:
receiving at least one of a user and system input associated with a graphical user interface (GUI) of the electronic checklist, wherein the at least one of the user and system input is associated with executing the electronic checklist;
determining whether the at least one of the user and system input triggers a timer event;
in response to determining that the at least one of the user and system input triggers the timer event, determining whether the timer event is a first type of timer event or a second type of timer event;
in response to determining that the timer event is the first type of timer event, performing a sequential timer process; and
in response to determining that the timer event is the second type of timer event, performing a non-sequential timer process, wherein each of the sequential timer process and non-sequential timer process include measuring an elapsed time,
wherein the sequential timer process requires a user to wait until one or more conditions, associated with a timer function of the timer event of a task associated with the vehicle system, are satisfied before the user can continue executing the electronic checklist, and
the non-sequential timer process allows the user to continue the electronic checklist while the timer function tracks a timer for the task associated with the timer event.

16. The non-transitory computer-readable medium of claim 15, wherein the timer event is one or combinations of:
- a user input on a task to start a timer of a timer function of the task;
- a user input on a previous task or a linked task to start the timer of the timer function of the task;
- a system input indicating a vehicle system received an input within/above/below a threshold of a value or is in a defined state for the task; or
- a system input indicating a vehicle system received an input within/above/below a threshold of a value or is in a defined state for the previous task or linked task.

17. The non-transitory computer-readable medium of claim 15, further comprising:
- determining whether the timer ends or the one or more conditions are satisfied; and
- in response to determining the timer has ended or the one or more conditions are satisfied, displaying a notice on the GUI.

18. The non-transitory computer-readable medium of claim 17, further comprising, before displaying the notice on the GUI:
- determining whether the electronic checklist associated with the timer function is currently being displayed to the user or whether the user is completing the electronic checklist;
- in response to determining that the electronic checklist is currently being displayed or the user is completing the electronic checklist, displaying the notice with a confirmation icon; and in response to determining that the electronic checklist is not currently being displayed or the user is not completing the electronic checklist, displaying the notice with at least one of the confirmation icon and a link icon, the confirmation icon being selectable by a user input to indicate an affirmative recognition of the end of the timer function, the link icon being selectable by a user input to change the display to the GUI for the electronic checklist of the timer function.

19. The non-transitory computer-readable medium of claim 15, wherein the sequential timer process requires a user to wait by locking the GUI from further user inputs until one or more conditions, associated with a timer function of the timer event of a task, are satisfied before the user can continue executing the electronic checklist.

20. The non-transitory computer-readable medium of claim 15, wherein allowing the user to continue executing the electronic checklist comprises allowing the GUI to accept inputs.

* * * * *